(12) United States Patent
Yamanaka et al.

(10) Patent No.: US 8,299,402 B2
(45) Date of Patent: Oct. 30, 2012

(54) DISASSEMBLABLE STRUCTURE, ELECTRIC EQUIPMENT AND NON-ELECTRIC EQUIPMENT HAVING DISASSEMBLABLE STRUCTURE, AND DISASSEMBLING METHOD

(75) Inventors: Eiji Yamanaka, Ibaraki (JP); Michirou Kawanishi, Ibaraki (JP); Masahiko Ando, Ibaraki (JP); Yasuyuki Tokunaga, Ibaraki (JP); Tooru Nakashima, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 455 days.

(21) Appl. No.: 12/615,299

(22) Filed: Nov. 10, 2009

(65) Prior Publication Data

US 2010/0116807 A1    May 13, 2010

(30) Foreign Application Priority Data

Nov. 11, 2008 (JP) ................................. 2008-289038

(51) Int. Cl.
*B05B 1/00* (2006.01)
(52) U.S. Cl. ........ 219/209; 219/243; 428/344; 29/426.1
(58) Field of Classification Search .................. 219/209, 219/243; 428/344; 29/426.1
See application file for complete search history.

(56) References Cited

U.S. PATENT DOCUMENTS

2008/0145646 A1   6/2008   Ebisu et al.
2010/0021668 A1   1/2010   Shimokawa et al.

FOREIGN PATENT DOCUMENTS

| JP | 9115446 A | 5/1997 |
| JP | 2006-304079 A | 11/2006 |
| JP | 2008142674 A | 6/2008 |
| JP | 2008144116 A | 6/2008 |

OTHER PUBLICATIONS

Notification of Reasons for Refusal dated Jul. 10, 2012 from the Japanese Patent Office in counterpart Japanese application No. 2008-289038.

*Primary Examiner* — Long Pham
(74) *Attorney, Agent, or Firm* — Sughrue Mion, PLLC (57) ABSTRACT

The present invention relates to a disassemblable structure including: a double-coated pressure-sensitive adhesive tape or a double-coated pressure sensitive adhesive sheet including a substrate and pressure-sensitive adhesive layers formed on both surfaces of the substrate, at least one of the pressure-sensitive adhesive layers being a thermal foaming agent-containing pressure-sensitive adhesive layer; a heating element which foams the thermal foaming agent-containing pressure-sensitive adhesive layer by heating; and a pair of adherends joined to each other through the pressure-sensitive adhesive tape or sheet and the heating element.

10 Claims, 5 Drawing Sheets

DISASSEMBLABLE STRUCTURE, ELECTRIC EQUIPMENT AND NON-ELECTRIC EQUIPMENT HAVING DISASSEMBLABLE STRUCTURE, AND DISASSEMBLING METHOD

FIELD OF THE INVENTION

The present invention relates to a disassemblable structure by which joined portions of electric equipment such as liquid crystal display units, various kinds of television receivers and refrigerators or non-electric equipment including sealed packages such as printer toners can be easily disassembled, an electric equipment and a non-electric equipment having the disassemblable structure, and a disassembling method.

BACKGROUND OF THE INVENTION

In recent years, demands for the reuse of recyclable resources have tended to increase, and in various fields including electric equipment and non-electric equipment, manufactured products have been disassembled and separately collected for each constituent material.

For example, in cathode-ray tube television receivers, liquid crystal display units, liquid crystal television receivers, plasma television receivers and the like, a housing formed by joining a front cover and a back cover to each other, which constitutes an exterior, a cathode-ray tube or a display panel as a display portion, an electric source, a control circuit and the like are joined to proper places with a plurality of screws (see FIG. 1 in JP-A-2006-304079).

SUMMARY OF THE INVENTION

However, in conventional joined structures, a worker is required to release joining by loosening screws one by one with a screwdriver with respect to equipment to be scrapped and collected, which causes a disadvantage that a disassembling operation becomes complicated.

The invention has been made in view of such circumstances, and a main object thereof is to provide a disassemblable structure which makes it possible to easily disassemble adherends joined to each other, an electric equipment and a non-electric equipment having the disassemblable structure, and a disassembling method.

A first embodiment of the invention relates to a disassemblable structure including: a double-coated pressure-sensitive adhesive tape or a double-coated pressure sensitive adhesive sheet including a substrate and pressure-sensitive adhesive layers formed on both surfaces of the substrate, at least one of the pressure-sensitive adhesive layers being a thermal foaming agent-containing pressure-sensitive adhesive layer; a heating element which foams the thermal foaming agent-containing pressure-sensitive adhesive layer by heating; and a pair of adherends joined to each other through the pressure-sensitive adhesive tape or sheet and the heating element.

(Function and Effect)

According to this structure, between the adherends joined to each other with the double-coated pressure-sensitive adhesive tape or the double-coated pressure sensitive adhesive sheet, the double-coated pressure-sensitive adhesive tape or sheet is directly heated by the heating element, thereby thermally expanding and foaming the thermal foaming agent contained in the pressure-sensitive adhesive layer. The pressure-sensitive adhesive layer is expanded and deformed by foaming of thermal foaming agent and the like to generate unevenness in an interface with the adherend, resulting in a loss of adhesive force, thereby being able to easily disassemble the adherends joined to each other.

Incidentally, in the above-mentioned structure, the heating element is constituted, for example, by a metal film laminated on the double-coated pressure-sensitive adhesive tape or the double-coated pressure sensitive adhesive sheet, a metal wire embedded in a resinous substrate constituting the double-coated pressure-sensitive adhesive tape or the like, or a metal powder which is contained in the pressure-sensitive adhesive layer of the double-coated pressure-sensitive adhesive tape or the like.

Further, in the above-mentioned constitution, in order to heat the metal film or the metal wire, an electric source which supplies electric power may be provided in the adherends joined, or a connecting terminal which supplies electric power from an external electric source to the metal film or the metal wire may be provided.

In the case of the heating element constituted by allowing the metal powder to be contained, a magnetic head having an electromagnetic coil may be brought close to the heating element to inductively heat the thermal foaming agent-containing pressure-sensitive adhesive layer by electromagnetic induction.

A second embodiment of the invention relates to an electric equipment having a disassemblable structure in a portion where adherends are joined to each other, in which the disassemblable structure includes: a double-coated pressure-sensitive adhesive tape or a double-coated pressure sensitive adhesive sheet including a substrate and pressure-sensitive adhesive layers formed on both surfaces of the substrate, at least one of the pressure-sensitive adhesive layers being a thermal foaming agent-containing pressure-sensitive adhesive layer; a heating element which foams the thermal foaming agent-containing pressure-sensitive adhesive layer by heating; and a pair of the adherends joined to each other through the pressure-sensitive adhesive tape or sheet and the heating element, and in which the electric equipment has an electric source which supplies electric power to the heating element.

A third embodiment of the invention relates to an electric equipment having a disassemblable structure in a portion where adherends are joined to each other, in which the disassemblable structure includes: a double-coated pressure-sensitive adhesive tape or a double-coated pressure sensitive adhesive sheet including a substrate and pressure-sensitive adhesive layers formed on both surfaces of the substrate, at least one of the pressure-sensitive adhesive layers being a thermal foaming agent-containing pressure-sensitive adhesive layer; a heating element which foams the thermal foaming agent-containing pressure-sensitive adhesive layer by heating; and a pair of the adherends joined to each other through the pressure-sensitive adhesive tape or sheet and the heating element, and in which the electric equipment has a connecting terminal which supplies electric power from an external electric source to the heating element.

(Function and Effect)

According to the electric equipment having this structure, the thermal foaming agent contained in the pressure-sensitive adhesive layer is foamed by heating the heating element, resulting in a loss of adhesive force of the pressure-sensitive adhesive layer. Accordingly, the adherends joined to each other through the pressure-sensitive adhesive layer can be easily disassembled.

A fourth embodiment of the invention relates to a non-electric equipment having a disassemblable structure in a portion where adherends are joined to each other, in which the disassemblable structure includes: a double-coated pressure-sensitive adhesive tape or a double-coated pressure sensitive adhesive sheet including a substrate and pressure-sensitive adhesive layers formed on both surfaces of the substrate, at least one of the pressure-sensitive adhesive layers being a thermal foaming agent-containing pressure-sensitive adhesive layer; a heating element being constituted by a metal powder which is contained in at least one of the pressure-sensitive adhesive layers formed on the both surfaces of the substrate; and a pair of the adherends joined to each other through the pressure-sensitive adhesive tape or sheet and the heating element.

(Function and Effect)

According to the non-electric equipment having this structure, the magnetic head having the electromagnetic coil is brought close to a joined portion of the adherends, thereby inductively heating the metal powder contained in the pressure-sensitive adhesive layer. Associated with the induction heating, the thermal foaming agent contained in the pressure-sensitive adhesive layer is heated to be expanded and foamed, resulting in a loss of adhesive force of the pressure-sensitive adhesive layer. Accordingly, the adherends joined to each other through the double-coated pressure-sensitive adhesive tape or the double-coated pressure sensitive sheet can be easily disassembled.

A fifth embodiment of the invention relates to a method for disassembling adherends joined to each other, the method including: allowing a double-coated pressure-sensitive adhesive tape or a double-coated pressure sensitive adhesive sheet including a substrate and pressure-sensitive adhesive layers formed on both surfaces of the substrate, at least one of the pressure-sensitive adhesive layers being a thermal foaming agent-containing pressure-sensitive adhesive layer and a heating element to intervene between the adherends joined to each other; and heating the heating element to foam a thermal foaming agent contained in the thermal foaming agent-containing pressure-sensitive adhesive layer.

(Function and Effect)

According to this method, the double-coated pressure-sensitive adhesive tape or the double-coated pressure sensitive adhesive sheet having the thermal foaming agent-containing pressure-sensitive adhesive layer, which intervenes between the adherends, is heated with the heating element, thereby being able to expand and foam the thermal foaming agent contained in the pressure-sensitive adhesive layer to allow adhesive force of the pressure-sensitive adhesive layer to be lost. Accordingly, the adherends can be easily disassembled.

As described above, according to the disassemblable structure, the electric equipment and the non-electric equipment having the disassemblable structure, and the disassembling method, of the invention, the adherends are joined to each other with the double-coated pressure-sensitive adhesive tape or the double-coated pressure sensitive adhesive sheet having the thermal foaming agent-containing pressure-sensitive adhesive layer and the heating element allowed to intervene therebetween, whereby the thermal foaming agent is expanded and foamed when the pressure-sensitive adhesive layer is heated with the heating element, resulting in a loss of adhesive force of the pressure-sensitive adhesive layer. Accordingly, the adherends joined to each other can be easily disassembled.

DESCRIPTION OF REFERENCE NUMERALS AND SIGNS

1 Liquid crystal television receiver
2 Housing
2A Front cover
2B Back cover
15 Step portion
16 Sheet-like heating element
17 Double-coated pressure-sensitive adhesive tape
22 and 23 Thermal foaming agent-containing pressure-sensitive adhesive layers

DETAILED DESCRIPTION OF THE INVENTION

Examples of the invention will be described below with reference to drawings.

Figure 1:
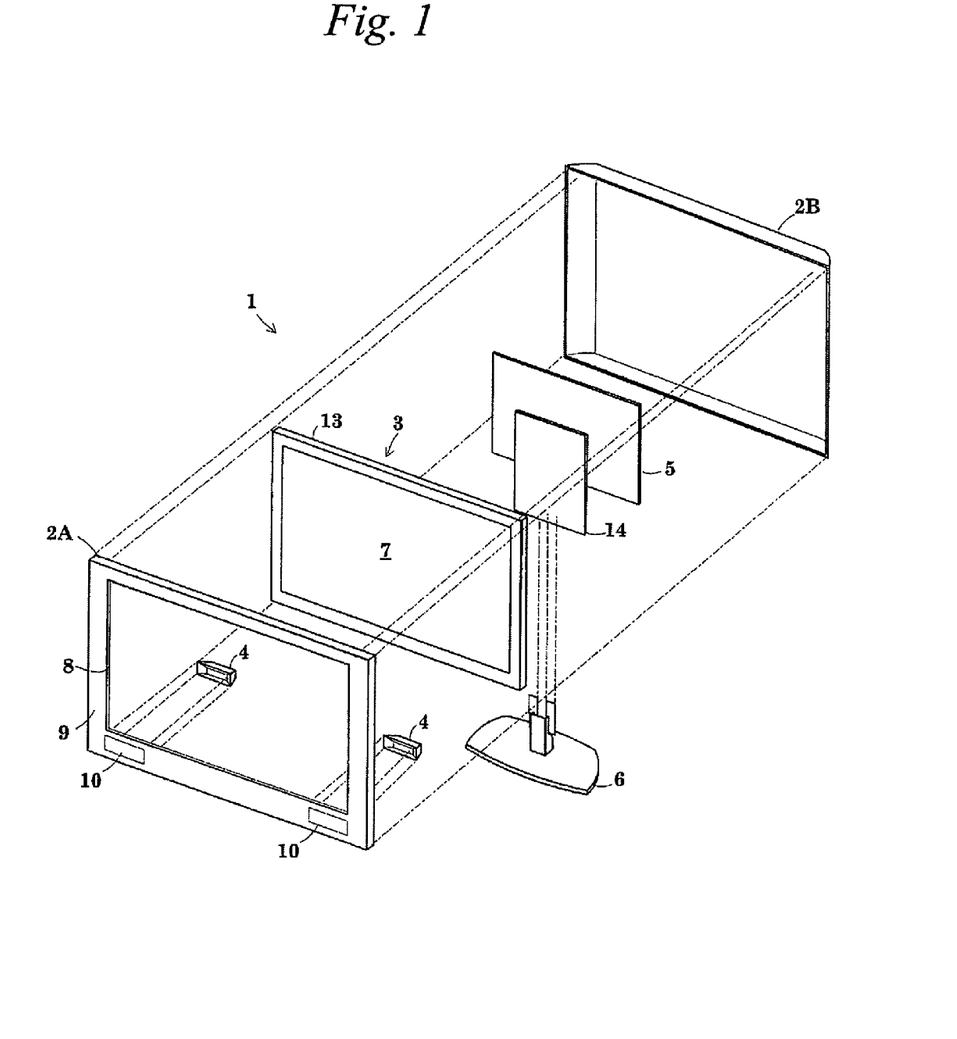
FIG. 1 is a front exploded perspective view showing a liquid crystal television receiver.
Figure 2:
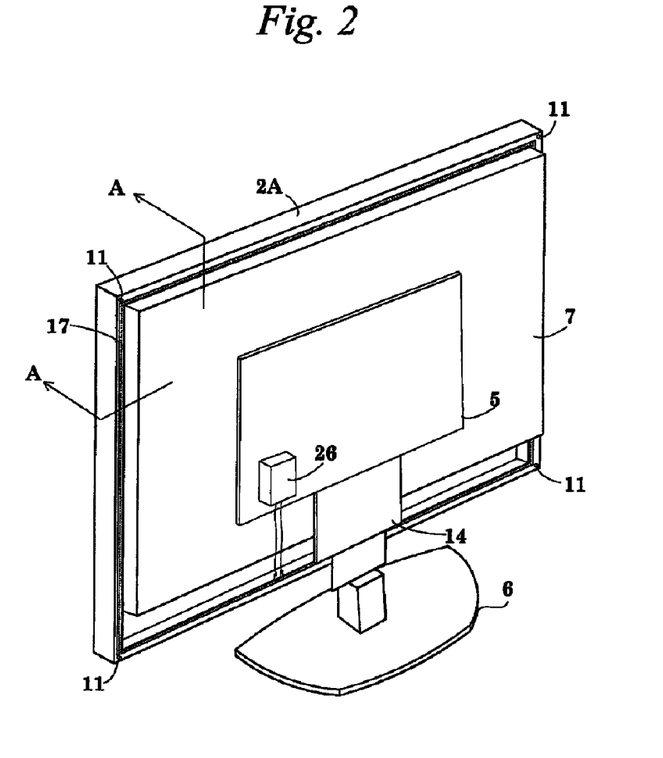
FIG. 2 is a back perspective view showing a liquid crystal television receiver.

FIG. 1 is an exploded perspective view showing a structure of a liquid crystal television device as an electric equipment. Additionally, FIG. 2 is a back perspective view showing a liquid crystal television receiver.

A liquid crystal television receiver 1 is constituted by a housing 2 including a front cover 2A and a back cover 2B, a liquid crystal display unit 3 housed in the housing 2, speaker units 4, a substrate 5 containing a control circuit for drive-controlling the liquid crystal display unit 3 and the speaker units 4 and a electric source circuit, and a stand 6 provided under the housing 2 and placed on a placing surface.

The front cover 2A has rectangular shape, and a panel opening 8 for exposing a liquid crystal panel 7 is formed in an inside thereof. A periphery of the panel opening 8 has a front panel 9 surrounding the liquid crystal panel 7. Further, attaching portions of the speaker units 4 are provided at a bottom inside the front cover 2A, and slits 10 are formed in portions thereof opposite to the speaker units. Further, guides 11 for positioning of the back cover 2B are projectedly provided in corner portions on a back side of the front cover 2A.

The back cover 2B is a rectangular box body, and is joined to the front cover 2A so as to house the liquid crystal display unit 3, the speaker units 4, the substrate 5 and a top portion of the stand 6. Further, guide holes 12 into which the guides 11 of the front cover 2A are fitted are formed in corner portions of the back cover 2B.

The liquid crystal display unit 3 is constituted by the liquid crystal panel 7 and a chassis 13 surrounding the liquid crystal panel 7 and provided with a back light unit, as shown in FIG. 1. Incidentally, as shown in FIGS. 1 and 2, a metallic back chassis 14 is joined to a back side of the liquid crystal display unit 3, and the stand 6 is fixed to the back chassis 14 with screws. Further, the substrate 5 is joined to a back side of the back chassis 14.

Figure 3:
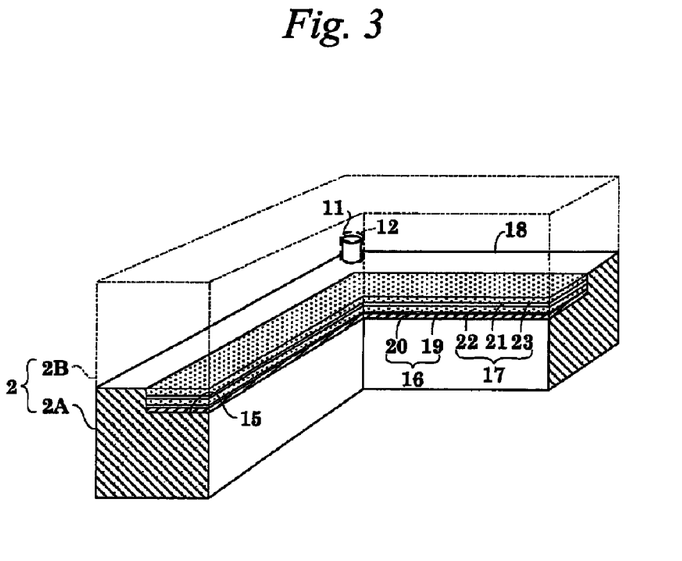
FIG. 3 is a cross-sectional view taken on line A-A of a front cover portion shown in FIG. 2.

A joining structure of the front cover 2A and the back cover 2B will be described below. FIG. 3 is a cross-sectional view showing a state where both covers 2A and 2B are joined to each other.

A rectangular step portion 15 is formed along a joined surface of front cover 2A, and has a laminated structure in which a sheet-like heating element 16 and a double-coated pressure-sensitive adhesive tape 17 are laminated in this order from a bottom surface of the step portion 15.

The height from the bottom surface of the step portion 15 to a convex portion 18 outside the step portion is set so as to become slightly lower than the surface height at the time when the sheet-like heating element 16 and the double-coated pressure-sensitive adhesive tape 17 are laminated to the laminated structure. That is to say, the height is set so that when both covers 2A and 2B are pressed to be joined to the double-coated pressure-sensitive adhesive tape 17, the double-coated pressure-sensitive adhesive tape 17 is elastically deformed to the same height as that of the step portion 15. Accordingly, no clearance is generated in a joined surface between both covers 2A and 2B.

The sheet-like heating element 16 is obtained by laminating a meander-shaped metal foil 19 of aluminum or the like on a pressure-sensitive adhesive layer applied on a base film of polyethylene terephthalate (PET) or the like, and further, laminating a cover film on a surface thereof. Further, a thermosetting pressure-sensitive adhesive layer 20 is formed on a back side of the base film. Thus, the sheet-like heating element is constituted so as to be joined to the front cover 2A.

Figure 4:
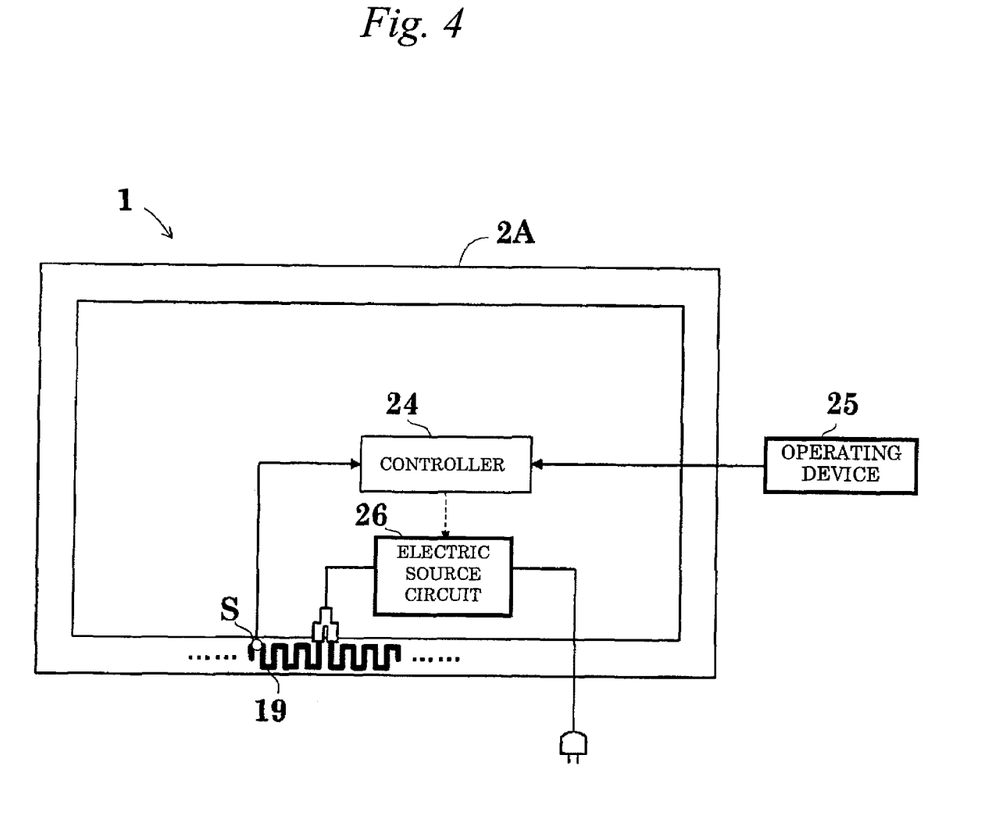
FIG. 4 is a block diagram showing a disassemblable structure.

Furthermore, the sheet-like heating element 16 is electrically connected to the substrate 5 equipped with an electric source circuit 26 through a controller 24, as shown in FIG. 4.

The double-coated pressure-sensitive adhesive tape 17 is, for example, a thermally-foamable re-releasable acrylic pressure-sensitive adhesive tape, and thermal foaming agent-containing pressure-sensitive adhesive layers 22 and 23 which thermally foam at different temperatures are each formed on front and back surfaces of a base material 21. In the case of this example, the thermal foaming agent contained in the thermal foaming agent-containing pressure-sensitive adhesive layer 22 in close contact with the sheet-like heating element 16 is higher in foaming temperature than the thermal foaming agent contained in the thermal foaming agent-containing pressure-sensitive adhesive layer 23.

The thermal foaming agent-containing pressure-sensitive adhesive layers 22 and 23 are not particularly limited as long as they are a layer composed of an acrylic pressure-sensitive adhesive containing a thermal foaming agent. For example, an acrylic polymer is contained as a base polymer.

Figure 5:
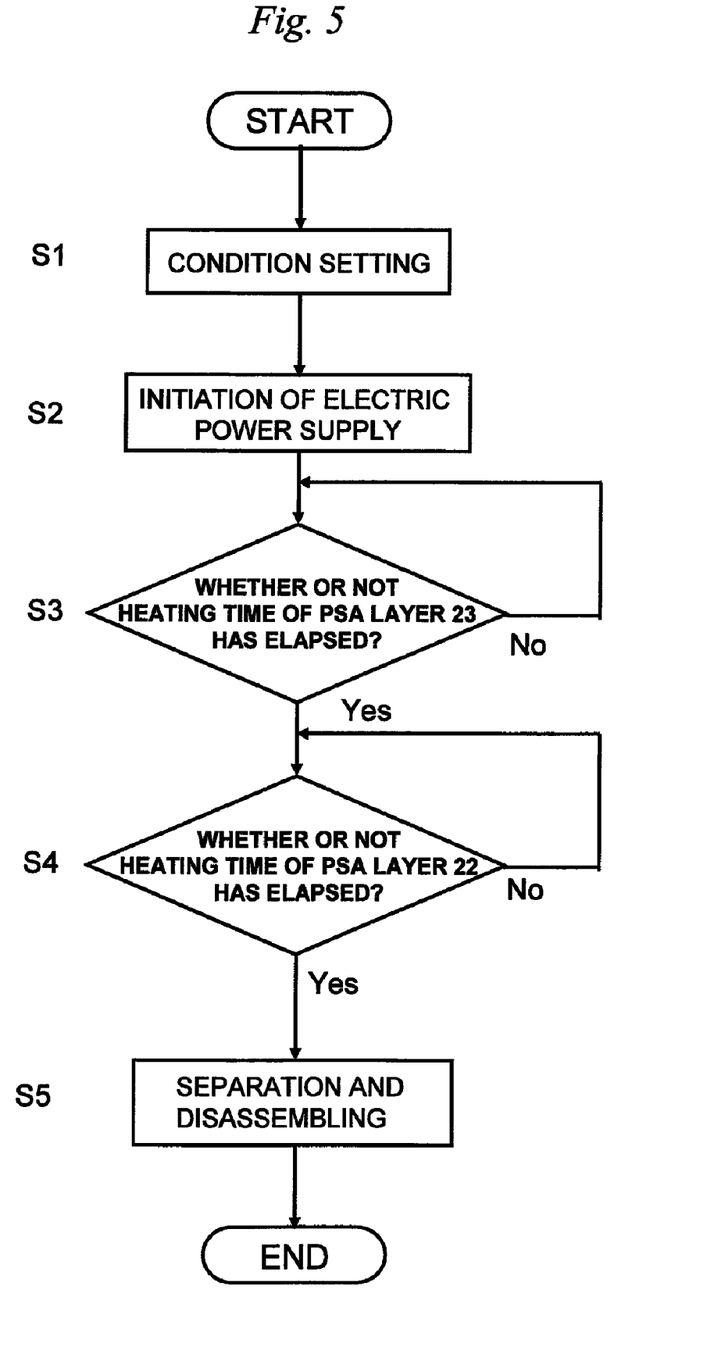
FIG. 5 is a flow chart showing a disassembling process of a liquid crystal television receiver.

Disassembling of the above-mentioned liquid crystal television receiver will be described below with reference to a flow chart shown in FIG. 5.

As shown in FIG. 4, an operating device 25 used exclusively for disassembling is connected to the liquid crystal television receiver 1, and electric power is supplied. A worker selects and sets an object to be disassembled from the operating device 25, thereby extracting data from a data base of the operating device 25 in which the foaming temperature of the foaming agent of the double-coated pressure-sensitive adhesive tape 17 used for joining the front and back covers 2A and 2B and the time until foaming is completed are preliminarily stored (step S1).

When the extracted data is sent from the operating device 25 to the controller 24 in the liquid crystal television receiver 1, the controller 24 operation controls the electric source circuit of the substrate 5 to initiate the supply of electric power to the sheet-like heating element 16 (step S2).

Associated with initiating the supply of electric power to the sheet-like heating element 16, a temperature detecting sensor of the sheet-like heating element 16 operates to detect the temperature in real time, and sends temperature information to the controller 24. The controller 24 operates the electric source circuit based on the received temperature information to perform feedback control so as to maintain a predetermined temperature. At this time, heating of the thermal foaming agent-containing pressure-sensitive adhesive layer 23 on the lower-temperature foaming side is initiated.

At the same time, the controller 24 performs timer count until the termination point of the heating time preliminarily set to the pressure-sensitive adhesive layer 23 on the lower-temperature foaming side (step S3). In this heating process, the thermal foaming agent in the thermal foaming agent-containing pressure-sensitive adhesive layer 23 is expanded and foamed to expand and deform the thermal foaming agent-containing pressure-sensitive adhesive layer 23, thereby unevenly deforming a joined interface with the back cover 2B. On reaching the termination point of the heating time, the adhesive force of the thermal foaming agent-containing pressure-sensitive adhesive layer 23 in the joined interface is lost, so that the back cover 2B comes separable and disassemblable from the thermal foaming agent-containing pressure-sensitive adhesive layer 23.

Subsequently, the controller 24 operates the electric source circuit so as to attain a heating temperature corresponding to the thermal foaming agent-containing pressure-sensitive adhesive layer 22 on the higher-temperature foaming side, and performs timer count until the termination point of the heating time preliminarily set (step S4). In this heating process, similarly to the case of the thermal foaming agent-containing pressure-sensitive adhesive layer 23, the thermal foaming agent is expanded and foamed to expand and deform the thermal foaming agent-containing pressure-sensitive adhesive layer 22. Accordingly, the double-coated pressure-sensitive adhesive tape 17 is made separable from the front cover 2A.

When the heating time of the thermal foaming agent-containing pressure-sensitive adhesive layer 22 has elapsed, the controller 24 terminates the supply of electric power to the sheet-like heating element 16. In this state, the worker stops the supply of electric power to the liquid crystal television receiver 1, releases the connection of the operating device 25, and separates the front and back covers 2A and 2B (step S5).

This is the completion of separation and disassembling of the front cover 2A and the back cover 2B of the liquid crystal television receiver 1.

As described above, the front cover 2A and the back cover 2B as the adherends are joined to each other in a state where the double-coated pressure-sensitive adhesive tape 17 having the thermal foaming agent-containing pressure-sensitive adhesive layers 22 and 23 and the sheet-like heating element 16 in direct contact with the double-coated pressure-sensitive adhesive tape 17 are allowed to intervene therebetween, thereby being able to allow the adhesive force of the double-coated pressure-sensitive adhesive tape 17 to be lost, only by heating the sheet-like heating element 16. Accordingly, the front and back covers 2A and 2B as the adherends can be easily disassembled.

The invention is not limited to the above-mentioned example, and can also be carried out in modified form as described below.

(1) In the above-mentioned example, description has been made taking as an example the device equipped with the electric source in the housing as the adherends. However, in the case of an electric equipment or a non-electric equipment equipped with no electric source in the inside thereof, it may be constituted as follows. For example, a main body of the equipment is equipped with an external connecting terminal which supplies electric power, and electric power is supplied to a sheet-like heating element allowed to exist in a cover member or allowed to intervene between constituent members joined to each other, by utilizing an electric source connected to the external connecting terminal, thereby heating the thermal foaming agent-containing pressure-sensitive adhesive layer. Incidentally, in this constitution, electric power can be supplied to the main body of the equipment through an operating device, and the heating temperature and the heating time can be controlled by this controlling device.

Figure 6:
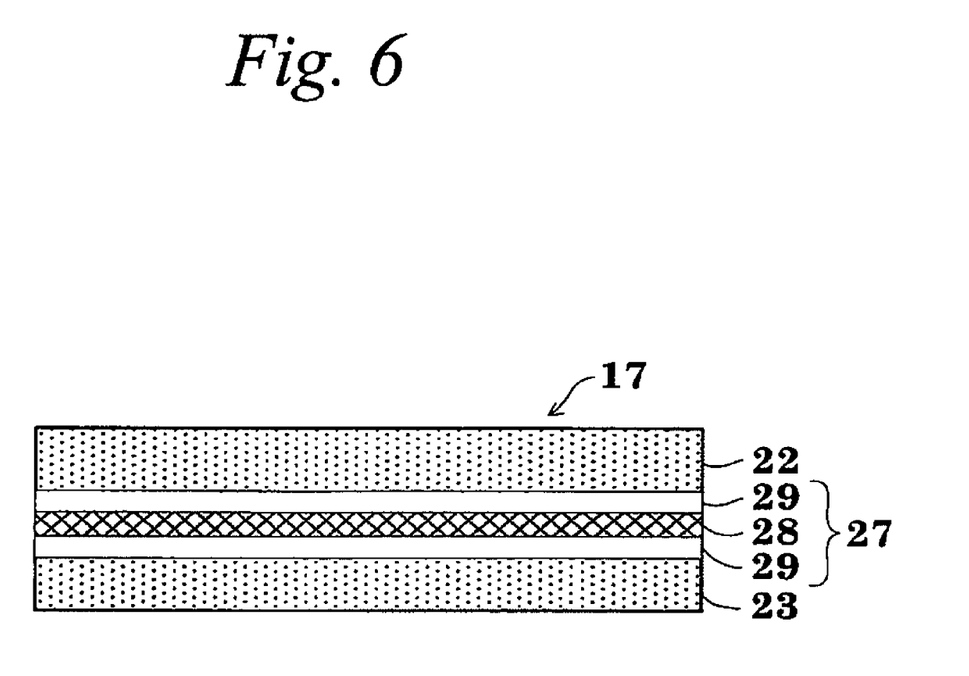
FIG. 6 is a cross-sectional view showing a structure of a double-coated pressure-sensitive adhesive tape of another example.

As another embodiment, the substrate 21 or the pressure-sensitive adhesive layers 22 and 23 of the double-coated pressure-sensitive adhesive tape 17 may be allowed to have the constitution of the sheet-like heating element 16. In the case of this constitution, for example, a substrate 27 acting as the sheet-like heating element is not particularly limited, as long as it has a characteristic of generating heat by energization. Examples thereof include one in which a metal foil 28 (film of various kinds) or a metal wire having a high electric resistance such as an electrically heated wire (for example, a nichrome wire (a metal wire of a nickel-chromium alloy)) or a metal wire of an iron-chromium alloy is wired in a meander shape in a resin film 29, as shown in FIG. 6, one in which a metal foil is wired in the resin film, a conductive resin in which conductive particles such as conductive carbon particles are kneaded in a resin, and the like. Further, for example, the heating element may be a metal powder which is contained in at least one of the pressure-sensitive adhesive layers formed on the both surfaces of the substrate.

In the case of this constitution, electric power is not directly supplied to the heating element, and a magnetic head having an electromagnetic coil is brought close to the joined portion of the adherends to inductively heat the heating element in a noncontact manner by electromagnetic induction, thereby being able to expand or foam the thermal foaming agent of the thermal foaming agent-containing pressure-sensitive adhesive layers 22 and 23 to allow adhesive force of the pressure-sensitive adhesive layers to be lost. Accordingly, also in this constitution, the adherends joined to each other can be easily disassembled similarly to the above-mentioned example.

(2) In the above-mentioned example, description has been made taking as an example the liquid crystal television receiver. However, the invention should not be construed as being limited to this device, and the above-mentioned disassemblable structure and disassembling method can be suitably applied to all of an electric equipment containing an electric source, an electric equipment containing no electric source and a non-electric equipment as a structure requiring joining.

(3) In the above-mentioned example, description has been made taking as an example the case where both of the pressure-sensitive adhesive layers formed on the both side of the double-coated pressure-sensitive adhesive tape 17 are the thermal foaming agent-containing pressure-sensitive adhesive layers. However, it is not necessary that both of the pressure-sensitive adhesive layers are thermal foaming agent-containing pressure-sensitive adhesive layers. One of the pressure-sensitive adhesive layers formed on both side of the double-coated pressure-sensitive adhesive tape 17 may be a pressure-sensitive adhesive containing no thermal foaming agent.

(4) In the above-mentioned each example, description has been made taking as an example the double-coated pressure-sensitive adhesive tape 17. However, a double-coated pressure-sensitive adhesive sheet may be used. By using the double-coated pressure-sensitive adhesive sheet, it can be applied not only to a place having a narrow joined area such as between the front and back covers 2A and 2B, but also to a place having a wide contact area such as between the liquid crystal panel 7 and the back chassis. Accordingly, the disassemblable structure of the invention can be suitably applied to all places having a joined structure by appropriately properly using the double-coated pressure-sensitive adhesive tape and the double-coated pressure-sensitive adhesive sheet, depending on the conditions of the joined portion.

While the invention has been described in detail and with reference to specific embodiments thereof, it will be apparent to one skilled in the art that various changes and modifications can be made therein without departing from the spirit and scope thereof.

This application is based on Japanese Patent Applications (Patent Application Nos. 2008-289038) filed on Nov. 11, 2008, the entirety of which is incorporated herein by way of reference.

As described above, according to the disassemblable structure, the electric equipment and the non-electric equipment having the disassemblable structure, and the disassembling method, of the invention, the adherends are joined to each other with the double-coated pressure-sensitive adhesive tape or the double-coated pressure sensitive adhesive sheet having the thermal foaming agent-containing pressure-sensitive adhesive layer and the heating element allowed to intervene therebetween, whereby the thermal foaming agent is expanded and foamed when the pressure-sensitive adhesive layer is heated with the heating element, resulting in a loss of adhesive force of the pressure-sensitive adhesive layer. Accordingly, the adherends joined to each other can be easily disassembled.

What is claimed is:

1. A disassemblable structure comprising:
 a double-coated pressure-sensitive adhesive tape or a double-coated pressure sensitive adhesive sheet comprising a substrate and pressure-sensitive adhesive layers formed on both surfaces of the substrate, at least one of said pressure-sensitive adhesive layers being a thermal foaming agent-containing pressure-sensitive adhesive layer;
 a heating element which foams the thermal foaming agent-containing pressure-sensitive adhesive layer by heating; and
 a pair of adherends joined to each other through the pressure-sensitive adhesive tape or sheet and the heating element.

2. The disassemblable structure according to claim 1, wherein the heating element is a metal film.

3. The disassemblable structure according to claim 1, wherein the substrate comprises a resin and the heating element is a metal wire embedded in said substrate.

4. The disassemblable structure according to claim 1, wherein the heating element is constituted by a metal powder which is contained in at least one of the pressure-sensitive adhesive layers formed on the both surfaces of the substrate.

5. The disassemblable structure according to claim 1, comprising an electric source which supplies electric power to the heating element, in the adherends joined.

6. The disassemblable structure according to claim 1, comprising a connecting terminal which supplies electric power from an external electric source to the heating element.

7. An electric equipment having a disassemblable structure in a portion where adherends are joined to each other,
 wherein said disassemblable structure comprises:
 a double-coated pressure-sensitive adhesive tape or a double-coated pressure sensitive adhesive sheet comprising a substrate and pressure-sensitive adhesive layers formed on both surfaces of the substrate, at least one of said pressure-sensitive adhesive layers being a thermal foaming agent-containing pressure-sensitive adhesive layer;

a heating element which foams the thermal foaming agent-containing pressure-sensitive adhesive layer by heating; and a pair of the adherends joined to each other through the pressure-sensitive adhesive tape or sheet and the heating element, and wherein the electric equipment has an electric source which supplies electric power to the heating element.

8. An electric equipment having a disassemblable structure in a portion where adherends are joined to each other, wherein said disassemblable structure comprises:

a double-coated pressure-sensitive adhesive tape or a double-coated pressure sensitive adhesive sheet comprising a substrate and pressure-sensitive adhesive layers formed on both surfaces of the substrate, at least one of said pressure-sensitive adhesive layers being a thermal foaming agent-containing pressure-sensitive adhesive layer;

a heating element which foams the thermal foaming agent-containing pressure-sensitive adhesive layer by heating; and a pair of the adherends joined to each other through the pressure-sensitive adhesive tape or sheet and the heating element, and wherein the electric equipment has a connecting terminal which supplies electric power from an external electric source to the heating element.

9. A non-electric equipment having a disassemblable structure in a portion where adherends are joined to each other, wherein said disassemblable structure comprises:

a double-coated pressure-sensitive adhesive tape or a double-coated pressure sensitive adhesive sheet comprising a substrate and pressure-sensitive adhesive layers formed on both surfaces of the substrate, at least one of said pressure-sensitive adhesive layers being a thermal foaming agent-containing pressure-sensitive adhesive layer;

a heating element being constituted by a metal powder which is contained in at least one of the pressure-sensitive adhesive layers formed on the both surfaces of the substrate; and a pair of the adherends joined to each other through the pressure-sensitive adhesive tape or sheet and the heating element.

10. A method for disassembling adherends joined to each other, said method comprising:

allowing a double-coated pressure-sensitive adhesive tape or a double-coated pressure sensitive adhesive sheet comprising a substrate and pressure-sensitive adhesive layers formed on both surfaces of the substrate, at least one of said pressure-sensitive adhesive layers being a thermal foaming agent-containing pressure-sensitive adhesive layer and a heating element to intervene between the adherends joined to each other; and heating the heating element to foam a thermal foaming agent contained in the thermal foaming agent-containing pressure-sensitive adhesive layer.

* * * * *